United States Patent [19]

Wiebe et al.

[11] Patent Number: 4,660,654
[45] Date of Patent: Apr. 28, 1987

[54] IMPLEMENT WING FRAME FOLDING APPARATUS WITH AUTOMATICALLY PIVOTED BIASED LATCH

[75] Inventors: Kenneth J. Wiebe, Dundas; Eugen J. Bexten, Ancaster, both of Canada

[73] Assignee: J. I. Case Company, Racine, Wis.

[21] Appl. No.: 820,088

[22] Filed: Jan. 21, 1986

[51] Int. Cl.⁴ .............................................. A01B 73/04
[52] U.S. Cl. .................................. 172/776; 172/311; 172/456; 172/466
[58] Field of Search ............... 172/311, 446, 456, 466, 172/776

[56] References Cited

U.S. PATENT DOCUMENTS

| | | | |
|---|---|---|---|
| 3,814,191 | 6/1974 | Tilbury | 172/311 |
| 3,944,001 | 3/1976 | Warner et al. | 172/311 |
| 4,204,575 | 5/1980 | Richardson et al. | 172/311 X |
| 4,244,428 | 1/1981 | Sloan | 172/126 |
| 4,295,661 | 10/1981 | Maurer | 280/765 |
| 4,561,505 | 12/1985 | Williamson | 172/311 X |

Primary Examiner—Richard T. Stouffer
Attorney, Agent, or Firm—Dressler, Goldsmith, Shore, Sutker & Milnamow, Ltd.

[57] ABSTRACT

An implement wing frame folding apparatus is provided for a mobile machine and includes a main frame, a wing frame pivotally connected to the main frame, and a striker pin offset from the pivot axis of the wing frame. A float bar having first and second ends is provided with the first end pivotally connected to the wing frame. An actuating device is pivotally connected to and between the main frame and the float bar second end for selectively moving the float bar to pivot the wing frame between lowered and raised positions. A latch is pivotally mounted to the main frame for engaging the striker pin in an engaging position when the wing frame is in the raised position. A biasing mechanism is provided on the main frame for biasing the latch toward the engaging position.

9 Claims, 9 Drawing Figures

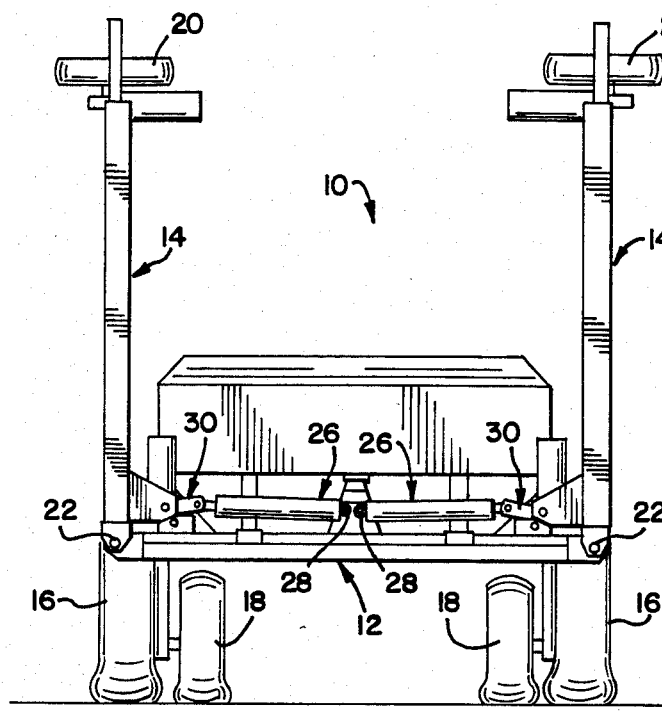
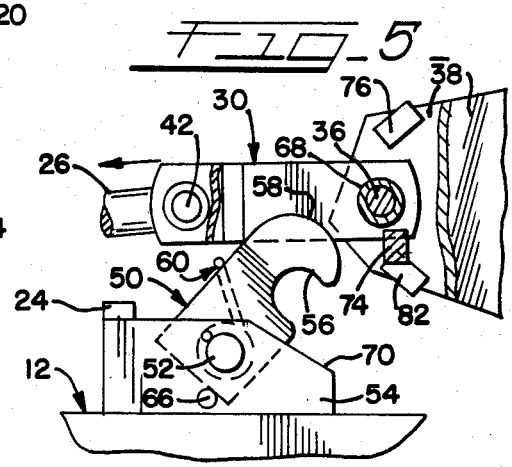
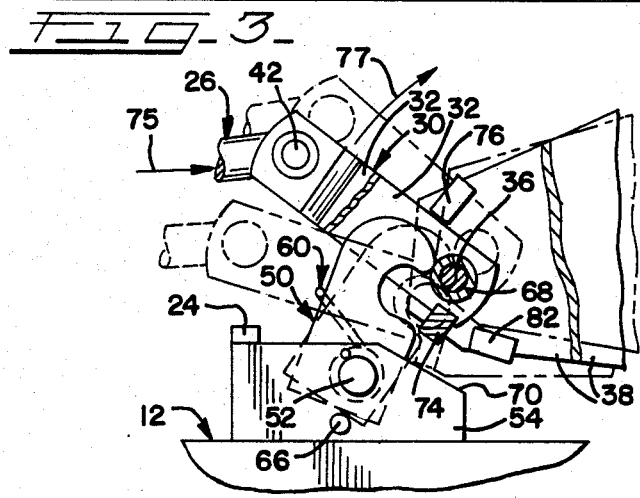
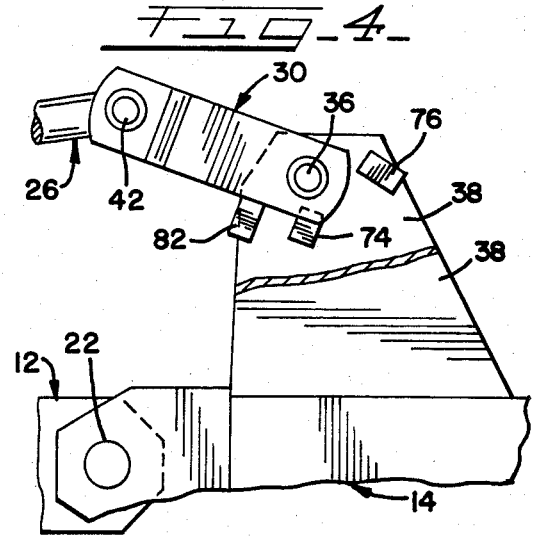
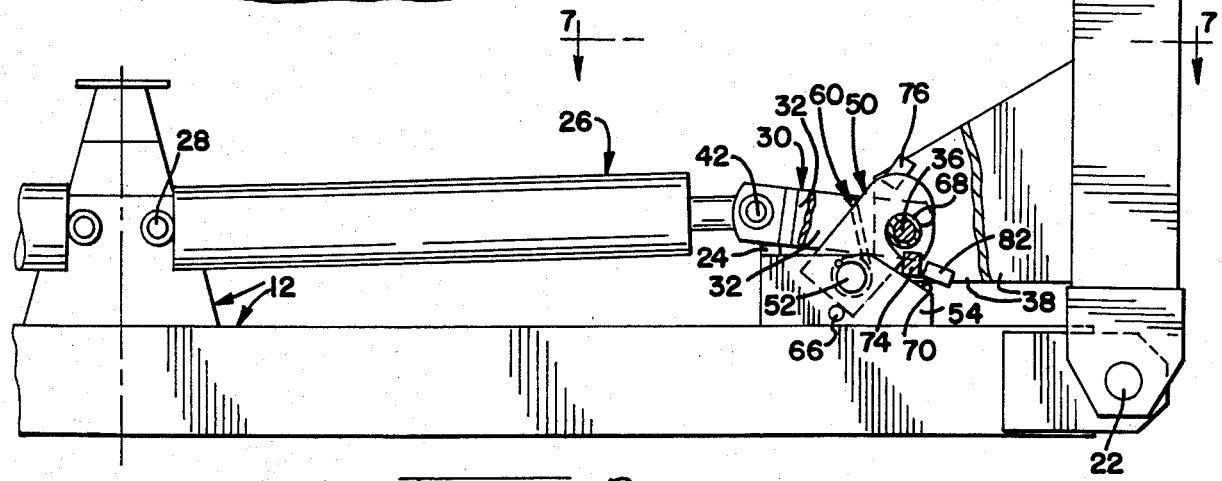

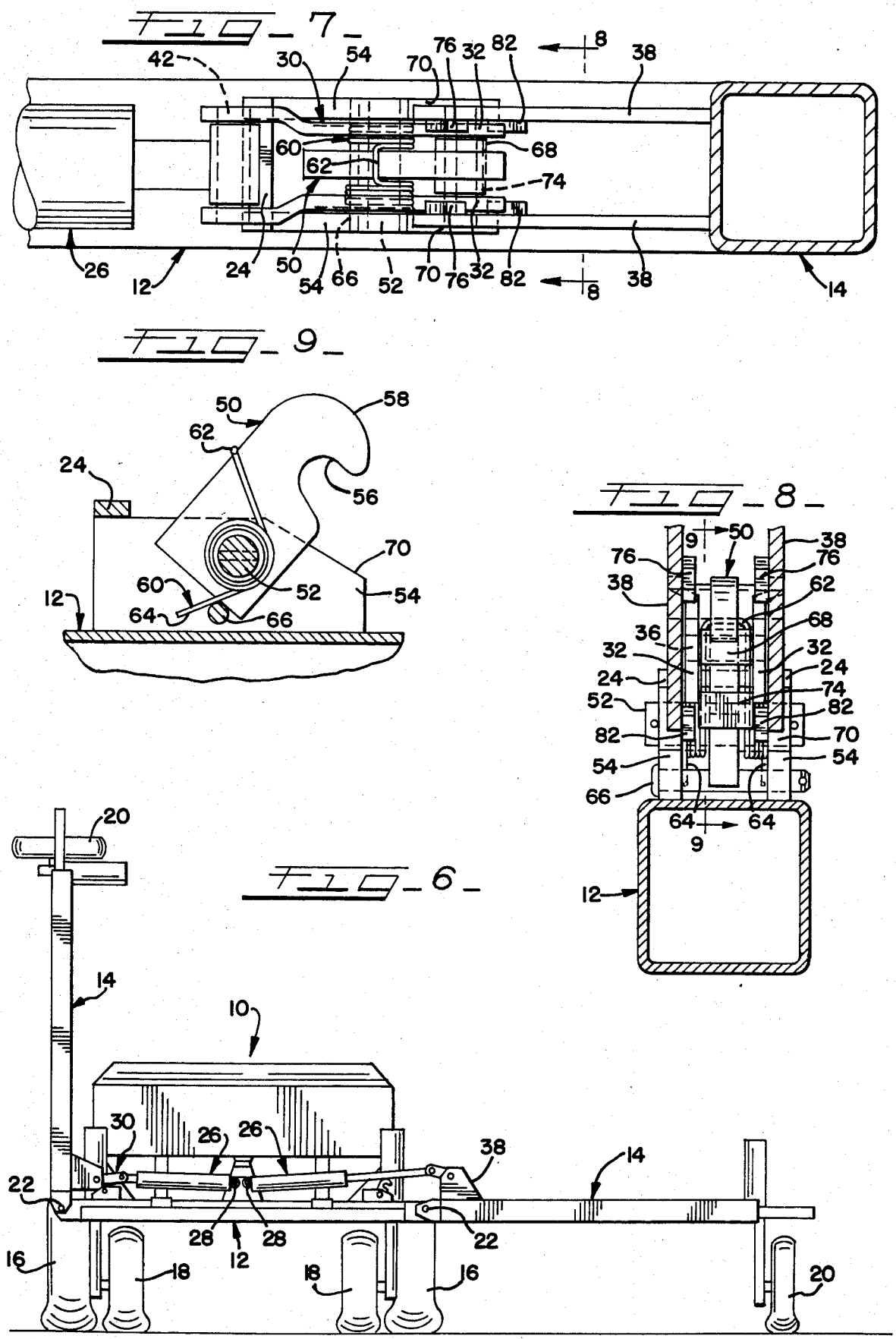

IMPLEMENT WING FRAME FOLDING APPARATUS WITH AUTOMATICALLY PIVOTED BIASED LATCH

TECHNICAL FIELD

This invention relates to apparatus for use on mobile machines with laterally extending devices. The invention is especially useful for mobile agricultural machines which have tool bars arranged in pivotally connected sections wherein one or more of the sections can be pivoted upwardly away from the ground to an elevated position.

BACKGROUND OF THE INVENTION AND TECHNICAL PROBLEMS POSED BY THE PRIOR ART

Various mobile machines, especially mobile agricultural machines, include earthworking implements arranged on laterally extending tool bars or wing frames. To accommodate transportation of such a machine along a highway, means are provided for pivotally swinging or folding one or more of the wing frames upwardly from a lowered ground-engaging position to a raised, inactive position.

Various conventional or non-conventional actuators may be employed to raise the wing frames. Once the wing frames are raised to the inactive position, mechanical or hydraulic locking systems are engaged to prevent the inadvertent lowering of the wing frames. For example, wing frames are typically raised with hydraulic actuators. In such a situation hydraulic fluid leakage in the valves, seals, lines, fittings or other places could permit the weight of the wing frames, or other imposed forces, to cause the wing frames to be lowered in the absence of locking systems.

Mechanical wing frame locking systems typically require that the operator raise the wing frame by operating the controls on the machine, dismount the machine and walk to the wing frame, insert a locking pin to secure each wing frame to a portion of the main frame, and then mount the machine again.

In addition to the disadvantages inherent in this labor intensive process, it is possible for the operator to forget to carry out the wing frame locking process altogether. Further, even if the wing frames are properly locked in the raised positions, it is possible for the operator to forget to remove the locking pins before operating the actuators to lower the wing frames. This could cause damage to the machinery. To avoid this possibility, the machinery could be structurally designed to accommodate the situation in which the operator forgets to remove the locking pins. However, this would increase the cost of the machinery.

Attempts to overcome the disadvantages of mechanical locking pin systems for maintaining wing frames in the raised, inactive positions have involved the use of automatically operated lock-up systems employing hydraulic actuators. Such lock-up systems are more expensive, requiring the use of additional hydraulic piston-cylinder actuators, valves, and hoses.

It would be desirable to provide an improved wing frame folding apparatus with automatic lock-up capability. It would be advantageous to provide such an apparatus wherein the lock-up capability could be automatically effected without requiring more complex and costly hydraulically operated latch mechanisms.

Further, it would be desirable to provide such an improved wing frame lock-up apparatus with means for ensuring that each raised wing frame can be positively urged back to the ground engaging position.

Finally, it would be beneficial to provide a wing frame assembly with a lock-up system that will permit pivoting movement ("float") of the wing frames when the wing frames are in the lowered, ground engaging positions so as to accommodate vertical variations in ground terrain.

SUMMARY OF THE INVENTION

A wing frame folding apparatus is provided with automatic lock-up and float capability. The apparatus includes a main frame and at least one wing frame pivotally connected to the main frame for movement between a raised position and a lowered ground engaging position. The wing frame includes a striker pin offset from the pivot axis of the wing frame.

A float bar having first and second ends is provided with the first end pivotally connected to the wing frame.

An actuating means is pivotally connected to and between the main frame and the float bar second end for selectively moving the float bar to pivot the wing frame between the lowered and raised positions.

A latch means is pivotally mounted to the main frame for engaging the striker pin in an engaging position to latch said striker pin when the wing frame is in the raised position. A biasing means is provided on the main frame for biasing the latch means toward the engaging position.

Numerous other features and advantages of the present invention will become readily apparent from the foregoing detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a rear elevation view of a mobile machine incorporating the apparatus of the present invention;

FIG. 2 is a greatly enlarged, fragmentary, rear elevational view of a portion of the right-hand rear portion of the machine illustrated in FIG. 1 showing a wing frame latched in the raised position;

FIG. 3 is an enlarged, fragmentary, rear elevational view of the right-hand rear portion of the apparatus illustrated in FIG. 2 with the unlatched wing frame being moved away from the fully raised position;

FIG. 4 is a view similar to FIG. 3 but showing the wing frame in the fully lowered position;

FIG. 5 is a view similar to FIG. 4 but showing the wing frame being moved from the lowered position toward the fully raised position;

FIG. 6 is a rear elevational view similar to FIG. 1 but showing the right-hand wing frame in the fully lowered position;

FIG. 7 is a fragmentary, enlarged, top plan and partial cross-sectional view taken generally along the plane 7—7 in FIG. 2;

FIG. 8 is a fragmentary, cross-sectional view taken generally along the plane 8—8 with 7; and FIG. 9 is a cross-sectional view taken generally along the plane 9—9 in FIG. 8 but with the wing frame and float bar omitted to better illustrate the latch means.

DESCRIPTION OF THE PREFERRED EMBODIMENT

Referring now to FIG. 1, a mobile machine is designated generally therein by the reference numeral 10. The machine 10 includes an earthworking implement comprising a central main frame 12 and two oppositely extending wing frames 14. In an agricultural machine, the main frame 12 and wing frames 14 would typically carry earthworking tools, such as those associated with planters, seed drills, chisel plows, etc. (not illustrated).

To accommodate road transport of the machine 10, the wing frames 14 are typically raised to an inactive position as illustrated in FIG. 1. In operation, the wing frames 14 are lowered to a ground engaging position as illustrated in FIG. 6 for the right-hand wing frame 14.

The machine 10 typically has a plurality of wheels 16, as well as wheels 18 associated with the main frame 12 and wheels 20 associated with the wing frames 14.

Each wing frame 14 is pivotally connected to an end of the main frame 12 about a pin 22. Each wing frame 14 is movable between the raised, inactive position and the lowered ground engaging position by an actuating means 26 which is operative to move the wing frame 14 relative to the main frame 12. The actuating means 26 may include any suitable conventional or non-conventional mechanism for effecting movement of the wing frame 14 about the pivot pin 22. In the preferred embodiment illustrated, each actuating means 26 is a dual acting hydraulic cylinder-piston actuator. At one end, the actuating means 26 is pivotally connected to a portion of the main frame 12, as at connection pin 28. At the other end, the actuating means 26 is connected to the wing frame 14 through a float bar 30.

The float bar 30 includes two spaced-apart links 32 (FIG. 7 and FIG. 8). The float bar 30, as defined by the two links 32, has a first end pivotally connected to a pin 36 (FIGS. 5 and 7) which is carried between two spaced-apart, parallel wing plates 38 that are mounted to, and form part of, the wing frame 14. The other, or second, end of the float bar 30 is pivotally connected to the actuating means 26 about a pin 42.

A latch means 50 is pivotally mounted to the main frame 12 about a pin 52 which is carried between two spaced-apart plates 54 that are mounted to, and form part of, the main frame 12. As best illustrated in FIG. 9, the latch means 50 includes a hook portion defining a concave latch surface 56 and an upper exterior cam follower surface 58.

The latch means 50 is urged by a biasing means 60 in the clockwise direction as viewed in FIG. 9. The biasing means 60, in the preferred embodiment illustrated, is a torsion spring disposed around the pivot pin 52. The torsion spring biasing means 60 has an upper portion 62 engaging the back of the latch means 50 and a lower portion 64 engaging a retainer pin 66 which is carried between the main frame plates 54.

The latch means 50 is adapted to engage the wing frame 14 and hold the wing frame 14 in the raised position. To this end, a striker pin is provided in the form of a bushing 68 mounted concentrically on the pin 36 between the wing frame plates 38. The latch means 50 is adapted to be received between the float bar links 32 so that the concave latch surface 56 can engage the striker pin or bushing 68 to latch it, and thereby retain the wing frame 14 in the raised position as best illustrated in FIGS. 2, 7, and 8.

In operation, when the actuating means 26 is operated to raise the wing frame 14 as illustrated in FIG. 5, the striker pin 68 approaches the top of the latch means 50, engages the cam follower surface 58 on the top of the latch means 50, and pivots the latch means 50 in the counterclockwise direction until the striker pin 68 becomes aligned with the concave latch surface 56. Then the latch means 50 is urged in the clockwise direction by the biasing means 60 into full engagement with the striker pin 68 (FIG. 2).

A unique structure is provided for limiting the pivoting movement of the wing frame 14 to the upright, raised position illustrated in FIG. 2. Specifically, each plate 54 (to which the latch means 50 is mounted) functions as an engaging member with a sloping engaging surface 70 (FIGS. 2-5) for engaging a mating surface of the corresponding wing frame plate 38. The mating surfaces of the wing frame plates 38 and the main frame plates 54 are preferably configured so that the wing frame 14 is in a substantially vertical orientation as illustrated in FIG. 2 when the mating surfaces are engaged.

With continued reference to FIG. 2, it is seen that, when the wing frame 14 is in the raised position, the second end of the float bar 30 (which is pivotally connected about pin 42 to the actuating means 26) lies to one side (above) a straight line defined by the float bar first end pivot connection 36 and the pivot connection 28 of the actuating means to the main frame 12. This orientation is maintained by an engaging member 24 mounted on the plates 54 on the main frame 12. This structure permits operation of the actuating means 26 so as to lower the wing frame 14 (by extending the actuating means 26) while preventing rotation of the float bar 30 about pin 36 in the counterclockwise direction as viewed in FIG. 2. Any rotation of the float bar 30 about pin 36 from the position illustrated in FIG. 2 must necessarily occur in the clockwise direction.

When it is desired to lower the wing frame 14, the actuating means 26 is operated to move the float bar 30 outwardly (to the right as viewed in FIGS. 2 and 3). This causes the wing frame 14 to pivot about the pivot pin 22 (in the clockwise direction as viewed in FIG. 2). However, the latch means 50 must first be released to accommodate the pivoting movement of the wing frame 14. To this end, an engaging lug or member 74 is mounted between and to the lower portions of the first ends of each link 32 of the float bar 30. As best illustrated in FIG. 3, as the actuating means 26 moves the float bar 30 outwardly (in the direction of arrow 75 in FIG. 3), the float bar 30 also pivots about pins 36 and 42 and swings upwardly (in the direction of the arrow 77 in FIG. 3). This causes the side of the engaging member 74 to pivot the latch means 50 (counterclockwise as viewed in FIG. 3) to release the striker pin 68.

The weight of the wing frame 14 will act to help force the unlatched wing frame 14 to the lowered position. However, since the float bar 30 is pivoted on both ends (at pin 42 and at pin 36), the float bar 30 will tend to pivot as illustrated in FIG. 3 while undergoing only a relatively small outward movement (toward the right as viewed in FIG. 3). In case the wing frame 14 does not pivot sufficiently to be forced to the lowered position by the weight of the wing frame 14, means are provided for engaging another part of the wing frame 14 with the float bar 30. To this end, each wing frame plate 38 is provided with an engaging member 76 (FIGS. 2-5). Each engaging member 76 is located on the wing frame 14 so that it is spaced from the float bar 30 when the actuating means 26 has been operated to fully raise the wing frame 14. However, each engaging member 76 is also located such that it is engaged by the float bar 30 when the wing frame 14 is in the raised position but the actuating means 26 is being operated to move the float bar 30 to disengage the latch means 50. At that point, the float bar 30 contacts the engaging members 76 and pivots the wing frame 14 to the lowered position as illustrated in FIG. 3.

When the wing frame 14 is in the lowered position as illustrated in FIGS. 4 and 6, the wing frame 14 is free to pivot or "float" relative to the terrain encountered by the machine 10. This capability results from the frame pivot connection 22 and from the float bar 30 which is pivoted on each end at pins 36 and 42. However, in order to accomodate the desired float action, the pivot pin 42 of the float bar 30 must remain on one side of (above) the straight line defined by the float bar pivot connection 36 and the pivot connection of the actuating means 26 to the main frame 12 when the wing frame 14 is in the lowered position. To this end, each wing frame plate 38 includes an engaging member 82. As best illustrated in FIGS. 4 and 6, the engaging member 82 on each wing frame plate 38 engages the corresponding float bar link 32 to limit the rotation of the float bar 30 in the counterclockwise direction about pin 36. The pivot pin 42 thus remains above the straight line of action between the pivot pin 36 and the pivot connection 28 of the actuating means 26 to the main frame 12 when the wing frame 14 is in the lowered position.

It will be readily observed from the foregoing detailed description of the invention and from the illustrated embodiment thereof that numerous variations and modifications may be effected without departing from the spirit and scope of the novel concepts or principles of this invention.

What is claimed is:

1. In a mobile machine, an implement wing frame folding apparatus with automatic lock-up and float capability comprising:

a main frame;

a wing frame pivotally connected to said main frame and movable about a pivot axis thereof between a raised position and a lowered ground engaging position, said wing frame having a striker pin offset from the pivot axis of said wing frame;

latch means pivotally mounted directly to said main frame engaging said striker pin in an engaging position to latch said striker pin when said wing frame is in said raised position;

biasing means on said main frame biasing said latch means toward said engaging position;

said latch means comprising a cam follower surface engageable by said striker pin to pivot said latch means away from said engaging position when said wing frame is moved toward said raised position whereby further movement of said wing frame to said raised position effects disengagement between said cam follower surface and said striker pin and automatic movement of said latch means to said engaging position under the influence of said biasing means;

a float bar having first and second ends with said first end pivotally connected to said wing frame;

actuating means pivotally connected to and between said main frame and said float bar second end for selectively moving said float bar to pivot said wing frame between said lowered and raised positions; and a first engaging member on said float bar automatically pivoting said latch means to release said striker pin responsive to operation of said actuating means to lower said wing frame from said raised position.

2. The apparatus in accordance with claim 1 further including another engaging member located on said wing frame spaced from said float bar when said wing frame is moved to and in said raised position and engageable by said float bar when said actuating means is operated to move said wing frame from said raised position.

3. The apparatus in accordance with claim 1 further including another engaging member on said main frame engaging said float bar to prevent said float bar second end pivot connection from moving past center through a straight line defined by said float bar first end pivot connection and the pivot connection of said actuating means to said main frame when said wing frame is in said raised position.

4. The apparatus in accordance with claim 1 further including another engaging member on said main frame engaged by said wing frame when said wing frame is in said raised position to thereby define the limit of movement of said wing frame to said raised position.

5. The apparatus in accordance with claim 1 further including another engaging member on said wing frame engaging said float bar to prevent said float bar second end pivot connection from moving past center through a straight line defined by said float bar first end pivot connection and the pivot connection of said actuating means to said main frame when said wing frame is in said lowered position.

6. The apparatus in accordance with claim 1 in which said striker pin has a generally cylindrical configuration and in which said float bar first end is pivotally connected to said wing frame about an axis coincident with the axis of said striker pin.

7. The apparatus in accordance with claim 1 in which said latch means includes a hook portion defining a concave latch surface for engaging said striker pin and in which said biasing means includes a torsion spring.

8. The apparatus in accordance with claim 1 in which said float bar comprises two spaced-apart, parallel links defining a receiving region between them for receiving said latch means.

9. The apparatus in accordance with claim 1 in which said wing frame in said raised position is substantially upright.

* * * * *